US011987663B2

(12) United States Patent
Höflich et al.

(10) Patent No.: US 11,987,663 B2
(45) Date of Patent: May 21, 2024

(54) POLYURETHANE-ORGANOPOLYSILOXANES HAVING CARBODIIMIDE GROUPS

(71) Applicant: CHT Germany GmbH, Tübingen (DE)

(72) Inventors: Alexander Höflich, Tübingen (DE); Robert Zyschka, Wannweil (DE); Andreas Troscheit, Pliezhausen (DE); Matthias Bauer, Ehningen (DE); Silke Wezel, Reutlingen (DE)

(73) Assignee: CHT Germany GmbH, Tübingen (DE)

( * ) Notice: Subject to any disclaimer, the term of this patent is extended or adjusted under 35 U.S.C. 154(b) by 701 days.

(21) Appl. No.: 15/734,776

(22) PCT Filed: May 27, 2019

(86) PCT No.: PCT/EP2019/063618
§ 371 (c)(1),
(2) Date: Dec. 3, 2020

(87) PCT Pub. No.: WO2019/242997
PCT Pub. Date: Dec. 26, 2019

(65) Prior Publication Data
US 2021/0230348 A1 Jul. 29, 2021

(30) Foreign Application Priority Data

Jun. 18, 2018 (DE) ...................... 10 2018 114 549.7

(51) Int. Cl.
*C08G 18/79* (2006.01)
*C08G 18/12* (2006.01)
*C08G 18/50* (2006.01)
*C08G 18/61* (2006.01)
*C08L 75/04* (2006.01)
*D06B 1/00* (2006.01)
*D06M 15/564* (2006.01)

(52) U.S. Cl.
CPC .......... *C08G 18/797* (2013.01); *C08G 18/12* (2013.01); *C08G 18/5096* (2013.01); *C08G 18/61* (2013.01); *C08L 75/04* (2013.01); *D06B 1/00* (2013.01); *D06M 15/564* (2013.01)

(58) Field of Classification Search
CPC .... C08G 18/095; C08G 18/797; C08G 18/61; C08G 18/4009
See application file for complete search history.

(56) References Cited

U.S. PATENT DOCUMENTS

| 6,395,824 B1 * | 5/2002 | Beutler ................. C09D 175/06 524/591 |
| 6,767,954 B2 * | 7/2004 | Meyer-Roscher ..... C08G 18/10 524/840 |
| 2021/0163668 A1 * | 6/2021 | Bokel ................... C08G 18/61 |

FOREIGN PATENT DOCUMENTS

| CA | 3100629 A1 * | 11/2019 |
| CN | 105385401 A | 3/2016 |
| DE | 2602413 A1 | 7/1977 |
| DE | 3236466 C2 | 3/1990 |
| DE | 19733044 A1 | 2/1999 |
| DE | 102008054434 A1 | 6/2010 |
| DE | 102013224140 A1 | 5/2015 |
| EP | 0563961 B1 | 6/1995 |
| EP | 0933399 B1 | 9/2000 |
| JP | 2017160425 A | 9/2017 |
| WO | 2004/050472 A1 | 6/2004 |
| WO | 2006/002910 A1 | 1/2006 |
| WO | 2008/060681 A2 | 5/2008 |

OTHER PUBLICATIONS

Machine translation of CN 105385401 (no date).*
Dec. 6, 2021, Office Action issued in Corresponding Chinese Application No. 201980037223.6.
Jul. 29, 2019, International Search Report for International Patent Application No. PCT/EP2019/063618.

* cited by examiner

*Primary Examiner* — Marc S Zimmer
(74) *Attorney, Agent, or Firm* — Clements Bernard Walker; Christopher L. Bernard

(57) ABSTRACT

The invention relates to polyurethane and/or polyorganosiloxane copolymer compounds and salts thereof that contain carbodiimide moieties of formula [I]. Further, the invention relates to a process for the preparation thereof, to precursors for the preparation thereof, and to reactive compositions which contain such precursors and to their use for treating or finishing fibers, including hair and wool, and for permanently finishing, treating, impregnating textiles and leather or synthetic leather and other fibrous materials, and sheet materials and paper.

14 Claims, No Drawings

POLYURETHANE-ORGANOPOLYSILOXANES HAVING CARBODIIMIDE GROUPS

CROSS-REFERENCE TO RELATED APPLICATION(S)

This application is a U.S. National Stage Entry Under 35 U.S.C. 371 of International Application No. PCT/EP2019/063618 filed on May 27, 2019, which claims priority to German Patent Application 10 2018 114 549.7 filed on Jun. 18, 2018, the contents of which are incorporated herein by reference in their entirety.

FIELD OF THE INVENTION

The invention relates to polyurethane and/or polyorganosiloxane copolymer compounds and salts thereof that contain carbodiimide moieties of formula [I]:

—N═C═N—            [I]

Further, the invention relates to a process for the preparation thereof, to precursors for the preparation thereof, and to reactive compositions which contain such precursors and to their use for treating or finishing fibers, including hair and wool, and for permanently finishing, treating, impregnating textiles and leather or synthetic leather and other fibrous materials, and sheet materials and paper.

BACKGROUND OF THE INVENTION

Aqueous polyurethane and/or polyurea polyorganosiloxane copolymer compounds and those containing solvents have long and extensively been known for the treatment of surfaces (WO 2008/060681).

The preparation of polysiloxane carbodiimide copolymers has long been known and described in detail (DE 26 02 413 A1).

In addition, it has been known that polysiloxanes containing amino groups and/or polyurethane-polyorganosiloxane copolymers are suitable as textile softeners (WO 2006/002910).

It has also been known that an improvement of hydrophilicity can be achieved by introducing alkylene oxide moieties into such polymers.

Further, for example, WO 2008/060681 suggested the introduction of quaternary ammonium compounds into alkylene oxide-modified polysiloxanes and/or polyurethane-polyorganosiloxane copolymers in order to improve the substantivity of such products.

However, this suggestion does not represent a satisfactory solution to the problem that the mentioned systems are repeatedly exposed to aggressive environments for fiber treatment, and for the permanent finishing, treatment, impregnation of textiles, paper, wool and leather and synthetic leather by an alkaline medium, oxidative conditions, and during laundering, and thereby their activity is largely decreased or even completely lost.

One possibility of retaining the activity of a softener is treated in EP 0 933 399 A. The covalent cross-linking of aminosiloxanes takes place through a Michael addition by polyfunctional acrylic acid derivatives, which do not bind covalently to the substrate, however, but cross-link only with themselves and thus show a worse permanence.

A cross-linkable composition based on aminosilicone is also proposed in EP 0 563 961 A. The cross-linking takes place through anhydrides by an acylation reaction. However, the products described in this specification do no longer meet the current demands with respect to permanence.

Quaternary aminosiloxanes with terminal silanol groups are described in DE 32 36 466 A, in which the cross-linking is to take place through condensation of the additionally contained alkoxysilanes and additional cross-linkable trialkoxysilanes with the respective formation and separation of alkanol. Although the thus obtained products are characterized by a good soft handle, but do no longer meet the current requirements in terms of stability through several cycles of household laundering.

The invention of DE 10 2013 224 140 A deals with another approach for the permanent first finishing of a textile in which a hydrophobic finishing agent is covalently bound to the textile sheet through a blocked isocyanate with cleaving off of the low molecular weight blocking agent. However, what is disadvantageous is the toxicologically questionable blocking agent, which is released during the cross-linking process and in part remains on the fabric.

In contrast, WO 2004/050472 describes an approach to a solution without such a questionable condensation process, in which reactive amino or ammonium polysiloxane compounds are described. Although these can be covalently bound to the textile substrate through an isocyanate dimer, they have the disadvantage that aqueous storage-stable systems cannot be prepared thereby, because the isocyanate dimer will hydrolyze in an aqueous medium with separation of carbon dioxide and thus lose its activity.

Thus, none of these treated products can enhance the permanence of hydrophilic softeners for fiber treatment and for the permanent finishing, treatment, impregnation of textiles, paper, wool and leather or synthetic leather to yield a satisfactory result.

BRIEF SUMMARY OF THE INVENTION

Thus, it is the object of the invention to provide permanent and thus significantly more efficient and toxicologically safe and thus PBT- and CMR-free amino-functional and/or quaternary ammonium-functional formulations for the treatment and finishing of fibers including hair and wool, and for the permanent finishing, treatment, impregnation of textiles and leather or synthetic leather, and other fibrous materials, and sheets products and paper, based on polyurethane- and/or polyurea-polyorganosiloxane copolymer compounds that, according to the present invention, can be generally described by the formula

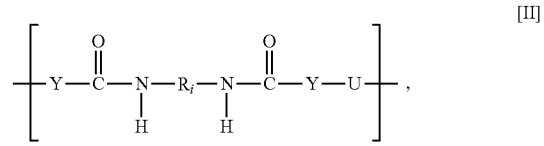

[II]

where $R_i$ has the structure

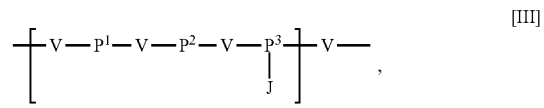

[III]

and further contain at least one carbodiimide function of formula [I], especially as softeners resistant to washing for textile finishing, in which the characteristic soft handle of such compounds is hardly affected even by repeated washing processes using anionic, cationic, amphoteric or non-ionic detergents.

DETAILED DESCRIPTION OF THE INVENTION

Carbodiimides of formula [I] can be incorporated into the structures [II] and [III] according to the invention by using diisocyanates of general formula [IV] in the construction of the polyurethane- and/or polyurea-polyorganosiloxane copolymer compounds (DE 197 33 044 A):

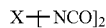   [IV]

The residues X are preferably derived by the abstraction of the monomeric diisocyanates usually employed in polyurethane chemistry, especially diisocyanates selected from aromatic, cycloaliphatic or aliphatic, linear or branched mono- or polyisocyanates and their mixtures of isomers having up to 15 carbon atoms. Examples of such isocyanates include diphenylmethane 2,2'-diisocyanate, di-phenylmethane 2,4'-diisocyanate, diphenylmethane 4,4'-diisocyanate (MDI), toluene 2,6-diisocyanate, toluene 2,4-diisocyanate (TDI), tetramethylxylylene diisocyanate (TMXDI), 1,4-diisocyanatobenzene, 1,4-bis(isocyanatomethyl)-benzene, 1,3-bis(isocyanatomethyl)benzene (XDI), tetramethylene diisocyanate, pentamethylene diisocyanate (PDI), hexamethylene diisocyanate (HDI), 2,4,4-trimethylhexamethylene 1,6-diisocyanate, 2,2,4-trimethylhexamethylene 1,6-diisocyanate (TMDI), dodecamethylene diisocyanate, 1,4-diisocyanatocyclo-hexane, 1,3-bis(isocyanatomethyl) cyclohexane (H6XDI), 3-isocyanatomethyl-3,5,5-trimethylcyclohexyl isocyanate (IPDI), 4,4'-diisocyanatodicyclohexylmethane (H12MDI), and isomers thereof, and mixtures of these compounds or their isocyanate-terminated prepolymers, which may be linear or branched in nature, and polyols corresponding to the prior art, which may optionally already contain urethane, biuret, isocyanurate, uretdione, ester, amide, ether or carbonate groups, in addition to a hydrocarbyl radical.

In addition, compounds of formula [I] may be established in polyurethane and/or polyurea polyorganosiloxane copolymer compounds as —V— in structure [III] according to the invention by the (poly)condensation of diisocyanates having structures of formula (IV), by preparing isocyanate-terminated oligomeric or polymeric carbodiimides of general formula [V] as precursors:

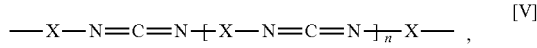   [V]

in which X is as defined above, and n represents a number from 0 to 10, and the compounds of structure [V] have an isocyanate functionality from 1 to 4, but preferably 2 in α,ω-terminal positions, and are capable, by their NCO functionality, of reacting with Zerewitinoff-active substances containing functionalities of general formula

   [VI]

in which $g \geq 1$, preferably $g=2$, and Y=—NRA- or —O—, and RA is hydrogen or a linear, branched, cyclic, saturated, unsaturated or aromatic hydrocarbyl radical with up to 20 carbon atoms, which may additionally contain several groups selected from —O—, —C(O)—, —NH—, tertiary amines, or quaternary ammonium compounds.

The polycondensation reaction of compounds of structures [IV] to [V] to form carbodiimide groups and separate carbon dioxide is described in detail in the literature and can be forced by suitable catalysts according to the invention, as described in W. Neumann, P. Fischer: The Preparation of Carbodiimides from Isocyanates. Angewandte Chemie, Vol. 1 (1962), pp. 621-625, for example.

As Zerewitinoff-active compounds shown by formula [VI], there are typically employed complex polymeric polyols or polyamines —$P^1$— and —$P^2$— containing hydroxy or amino groups, which may independently be selected from the classes of compounds of polycarbonates, polyesters, polyethers, polyacrylates, polyolefins, polydimethylsiloxanes, polylactones, polyamides, polyureas, or polyurethanes having an average molecular weight of from about 300 to 10,000 g/mol according to the prior art, wherein higher molecular weight polyols from the classes of polydimethylsiloxanes, polyesters and polyethers are particularly suitable for the preparation of the formulations according to the invention.

Generally, the class of polyester polyols, as known from, for example, U. Poth: Polyester und Alkydharze. Vincentz Network, 2012, is excellently suitable for the preparation of polyurethanes, wherein aliphatic, cycloaliphatic and aromatic monocarboxylic acids, dicarboxylic acids, tricarboxylic acids or hydroxycarboxylic acids are suitable for the preparation of such polyols, especially benzoic acid, 2-ethylhexanoic acid, maleic acid, maleic anhydride, succinic acid, glutaric acid, glutaric anhydride, adipic acid, pimelic acid, suberic acid, azelaic acid, sebacic acid, undecanedioic acid, dodecanedioic acid, tridecanedioic acid, tetradecanedioic acid, hexadecanedioic acid, dimeric fatty acids, phthalic acid, Phthalic anhydride, terephthalic acid, and isophthalic acid, hexahydrophthalic anhydride, cyclohexane-1,4-dicarboxylic acid, dimethylolpropionic acid, trimellithic anhydride, or mixtures thereof, which are esterified with aliphatic, cycloaliphatic and aromatic monols, diols or higher-functional alcohols, especially ethanediol, butanediol, pentanediol, hexanediol, octanediol, nonanediol, decanediol, undecanediol, dodecanediol, tridecanediol, tetradecanediol, hexadecanediol, dimeric fatty alcohols, neopentyl glycol, butylethylpropanediol, diethylene glycol, triethylene glycol, cyclohexanedimethanol, glycerol, trimethylolpropane, pentaerythritol, or mixtures thereof, which further also contain amide groups from a reaction with amines, or are alkyd-modified from a reaction with unsaturated fatty acids, wherein short-, medium- or long-chain oil alkyd resins may be used. In particular, polyester polyols with an average molecular weight of from 500 to 4000 g/mol, in particular, from 1000 to 2000 g/mol, are suitable.

From the class of substances of amino- or hydroxyfunctional polyalkoxyalkylamine, polyalkoxyalkanol, polyalkoxyamine or polyalkoxyalkanol compounds, preferably according to the invention, linear, mono- or bifunctional homopolymers or random polymers or block copolymers of butylene oxide, styrene oxide and especially ethylene oxide, tetrahydrofuran, propylene oxide or mixtures thereof are suitable, which can be polymerized by suitable initiator molecules, such as bifunctional alcohols or amines, e.g., ethylene glycol, propylene glycol, or ethylene diamine.

Particularly preferred are compounds having an average molecular weight of from 250 to 10,000 g/mol, especially those having a molecular weight of from 500 to 4000 g/mol.

Those particularly suitable for the purpose according to the invention include α,ω-primary or secondary amino- or hydroxyalkyl- or hydroxypolyetheralkyl-functionalized polyorganosiloxanes having the structure [VII]:

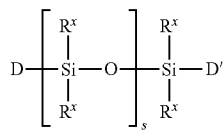
[VII]

in which s=2 to 500, more preferably from 5 to 200, D and D' are a primary or secondary hydroxy- or aminoalkyl- or hydroxypolyether-terminated organic radical having up to 200 carbon atoms, which is thus capable of undergoing a chemical addition reaction with isocyanates and can be prepared, for example, by a hydrosilylation reaction according to the prior art, D and D' additionally may be the same or different, and $R^x$ is a linear, branched, cyclic, saturated, unsaturated, aromatic, substituted, or unsubstituted hydrocarbyl radical having up to 20 carbon atoms, which may additionally bear amino or quaternary ammonium compounds or hydroxyalkyl or hydroxypolyetheralkyl groups, whereby a comb-like structure may be obtained. In addition, monofunctional polyorganosiloxanes having the structure [VIII] and [IX]:

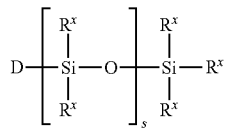
[VIII]

and

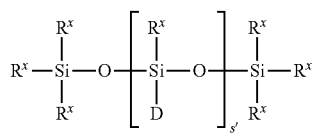
[IX]

are particularly suitable for the construction according to the invention of suitable polyurethane- and/or polyurea-polyorganosiloxane copolymer compounds that contain carbodiimide functions, wherein $R^x$ and D are as described above, and s'≥1, especially=1.

In order to achieve formulations of the polyurethane- and/or polyurea-polyorganosiloxane copolymer compounds in water according to the invention, isocyanate-terminated precursors having the structure —V— can be reacted with Zerewitinoff-active monomers of formula

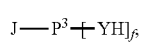
[X]

which possess one or more hydrophilic groups -J-, or can be converted to hydrophilic groups by suitable means.

Said hydrophilic or hydrophilizable groups are anionic groups or preferably groups of cationic or non-ionic nature.

As non-ionic hydrophilic groups, hydrophilic polyalkylene oxides having a functionality of from 1 to 3, especially polyethylene glycol diols or monols with 5 to 100, preferably 10 to 50, repeated sequences are used, whose proportion is preferably from 0 to 15% by weight, especially from 2 to 10% by weight, based on the weight of the monomers of the composition according to the invention.

Suitable ionic hydrophilic groups include, for example, anionic groups, especially carboxylate, sulfonate or phosphonate groups, preferably for the treatment of fibers or the finishing of fibers including hair and wool, and for permanent finishing, treatment, impregnation of textiles and leather or synthetic leather, and other fibrous materials, and sheets and paper, whereas cationic groups include, in particular, ammonium groups, protonated tertiary amino groups or quaternary ammonium groups that can be converted to their salts by simple neutralization, hydrolysis or quaternization reactions.

Monomers with carboxylic, sulfonic acid groups or phosphoric acid groups that can be converted to their anions by bases are usually of aliphatic, aromatic or cycloaliphatic nature and additionally bear at least one Zerewitinoff-active group of general functionality (VI), wherein preferably dihydroxysulfonic acids, dihydroxy-phosphonic acids, such as 2,3-dihydroxypropanephosphonic acid, or dihydroxy-carboxylic acids, such as dimethylolbutyric acid, especially dimethylolpropionic acid (bis-MPA), are used. The conversion of the carboxylic, sulfonic acid groups or phosphoric acid groups into their salts preferably takes place with a cation of an alkali metal or an ammonium ion as the cation. In particular, amines, especially triethylamine, dimethylethanolamine, trimethylamine or ammonia are preferably employed.

Alternatively, monomers with isocyanate-reactive amino groups, such as amino acids, especially lysine or alanine, may also be used, but mainly compounds of structure [XI]

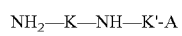
[XI], in which K and K' independently represent a linear, branched, cyclic, saturated, unsaturated or aromatic hydrocarbyl radical with up to 20 carbon atoms, preferably a $C_1$ to $C_5$ alkyl moiety, especially ethylene, and A represents COOH or $SO_3H$, or their alkali salts or ammonium salts, wherein Na is particularly preferred as the cation, and N-(2-aminoethyl)-2-aminoethanesulfonic acid is more particularly preferred. Compounds with tertiary amino groups, for example, tris(hydroxyalkyl)amines, N,N'-bis(hydroxyalkyl)alkylamines, N-hydroxyalkyldialkylamines, tris(aminoalkyl)amines, N,N'-bis(aminoalkyl)-alkylamines, N-aminoalkyldialkylamines, or quaternary ammonium compounds thereof obtained by suitable quaternization reactions are suitable, above all, as potentially cationic monomers according to the invention, wherein their alkyl radicals are linear, branched, cyclic, saturated, unsaturated or aromatic hydrocarbyl radicals with up to 20 carbon atoms, which may additionally contain several groups selected from —O—, —C(O)—, —NH—, tertiary amines, or quaternary ammonium compounds. Preferred are aliphatic hydroxy compounds, such as N,N-dimethylethanolamine, N,N,N'-trimethyl-N'-hydroxyethyl bisaminoethyl ether (Jeffcat® ZF-10), N,N-bis(3-dimethylaminopropyl)-N-isopropanolamine (Jeffcat® ZR50), 2-(2-dimethylaminoethoxy)ethanol (Jeffcat® ZR-70), N,N,N'-trimethylaminoethylethanolamine (Jeffcat® Z 110). N-Methyldi-ethanolamine, N-methyldipropanolamine or ethoxylated N-methyldiethanolamine are particularly preferred. Compounds containing, in addition to 2 hydroxy groups, at least one tertiary amino group not incorporated into the polymer skeleton, but remains pending are more particularly preferred. Examples thereof include N-(3-dimethylaminopropyl)-N,N-diethanolamine), N-(3-dimethylaminopropyl)-N,N-diisopropanolamine (Jeffcat® DPA), or N,N-bis(2-hydroxyethyl)isonicotinamide.

Such tertiary amines are converted to their corresponding salts using acids, wherein volatile organic and/or inorganic acids are preferably employed, because the hydrophobicity and permanence can be clearly increased by the evaporation of the acid at usual drying temperatures. Therefore, formic acid, propionic acid, hydrochloric acid, phosphoric acid, lactic acid, citric acid, are preferred, for example, and acetic acid is even more preferred according to the invention.

In aqueous medium, so-called chain extenders —U— according to the prior art are additionally common. These are preferably polyfunctional amines having a molecular weight of from 32 g/mol to 1000 g/mol. Examples thereof include hydrazine, ethylene diamine, diaminopropane, diaminobutane, hexamethylene diamine, piperazine, isophorone diamine (IPDA), or higher functional amines, such as diethylene triamine or triethylene tetramine. However, monofunctional amines employed as chain terminators, e.g., diethanolamine, and/or that simultaneously bear a hydrophilic group, e.g., 3-dimethylaminopropylamine, are particularly preferred according to the invention. Further, amino-functional polyethers with 2 to 100 repeating sequences of linear, mono- or bifunctional homopolymers or random polymers or block copolymers of butylene oxide, styrene oxide and especially ethylene oxide, tetrahydrofuran, propylene oxide or mixtures thereof are employed, because they increase the elasticity of the polymer obtained therefrom, and if ethylene oxide is contained as a monomer, they may contribute to the water dispersibility of the formulation. Such polyetheramines are obtainable, for example, as Jeffamines®. Further, the addition of chain extenders may also be dispensed with completely. The chain extension then takes place through the partial hydrolysis of remaining isocyanate groups to form amino groups.

As solvents, aprotic solvents that cannot undergo reactions with isocyanates are employed. Preferably, these are ketones, esters and ethers. Examples of ketones include acetone, methyl ethyl ketone, methyl isobutyl ketone, and cyclohexanone. Examples of esters include isopropyl acetate, butyl acetate, methoxypropyl acetate (Dowanol® PMA) and dipropylene glycol methyl ether acetate (Dowanol® DPMA), and dibasic esters. Examples of ethers include dipropylene glycol dimethyl ether (Propylenglykol® DME, Proglyde® DMM), or end-capped polyethylene glycols, such as Polyglycol DME 500.

Further, in order to accelerate the reaction of the isocyanates with Zerewitinoff-active compounds, the usual catalysts according to the prior art, such as dibutyltin dilaurate (DBTL), tin(II) octoate, 1,4-diazabicyclo[2.2.2]octane (DABCO), diazabicycloundecene (DBU), and compounds of transition metals, especially bismuth compounds, such as bismuth neodecanoate, or zinc compounds, such as zinc ethylhexanoate.

The compositions according to the invention can be in the form of a colloidal two-phase system, wherein dispersing aids that are anionic, cationic or non-ionic in nature are used to prepare these dispersions, emulsions or microemulsions, wherein, in particular, alkyl polyglycol ethers, alkylaryl polyglycol ethers containing from 8 to 30 carbon atoms and from 5 to 80 ethylene and/or propylene oxide moieties, block copolymers of ethylene oxide and propylene oxide, preferably with 5 to 40 EO or PO moieties, natural substances and derivatives thereof selected from lecithin, sapiones, cellulose, cellulose alkyl ether, and carboxyalkylcelluloses, and linear or branched (poly)dimethylsiloxanes with alkoxy groups from up to 50 EO or PO groups and 3 to 20 silicone moieties may be used as non-ionic emulsifiers. Further, alkyl sulfates, alkyl ether sulfates, alkyl sulfonates, alkylaryl sulfonates having a chain length of from 8 to 22 carbon atoms in the hydrophobic residue and from 1 to 40 ethylene or propylene oxide moieties, alkali or ammonium salts of carboxylic acids with 10 to 22 carbon atoms in the lipophilic residue, and the salts of phosphoric acid partial esters with 10 to 22 carbon atoms in the alkyl or alkaryl radical, and with up to 40 EO units. The salts of primary, secondary and tertiary fatty amines and quaternary ammonium compounds with 10 to 22 carbon atoms are preferably used as cationic dispersing aids, wherein possible salts include those, for example, of formic acid, acetic acid, lactic acid or other organic and inorganic acids, and in the case of quaternary ammonium compounds, their halides, sulfates, phosphates or acetates. In addition, fatty acid polyglycol esters, polyethoxylated fatty acid glycerides, sorbitan esters, alkylpolyglycosides, fatty acid alkylolamides, ethoxylated quaternary ammonium salts, betaines and sulfobetaines are suitable.

EXAMPLES

List of Compounds Employed
1-Isocyanato-3-isocyanatomethyl-3,5,5-trimethylcyclohexane: obtainable from Covestro
1-Isocyanato-4-[(4-isocyanatocyclohexyl)methyl]cyclohexane: obtainable from Covestro
3-Methyl-1-phenyl-2-pholene-1-oxide: obtainable from AlfaAesar
Dipropylene glycol dimethyl ether (Proglyde® DMM): obtainable from Archroma Distr. & Mgt. GmbH
Hansa SP 1046, α,ω-primarily hydroxypolyetheralkyl-functionalized polydimethyl-siloxane (OHZ 26 mg KOH/g): obtainable from CHT Germany GmbH
Hansa SP 1060 RP, monofunctional primarily hydroxypolyetheralkyl-functionalized trisiloxane (OHZ 80 mg KOH/g): obtainable from CHT Germany GmbH
BICAT® 8108M: obtainable from SHEPHERD MIRECOURT S.A.R.L.
Norcholine: obtainable from BASF SE
Jeffcat DPA: obtainable from Huntsman ICI Holland B.V.
Polyglycol M500: obtainable from Clariant
Propylene glycol diacetate (Dowanol PGDA®): obtainable from DOW
Terathane 2000®, bifunctional polytetrahydrofuran homopolymer (OHZ 56 mg KOH/g): obtainable from Invista
Hansa SP 1060, monofunctional, primarily hydroxypolyetheralkyl-functionalized trisiloxane (OHZ 80 mg KOH/g): obtainable from CHT Germany GmbH
Hansa ADD 4035, α,ω-primarily hydroxyalkyl-functionalized polydimethylsiloxane (OHZ 54 mg KOH/g): obtainable from CHT Germany GmbH
Dimethylaminopropylamine: obtainable from Huntsman ICI Holland B.V.
YMER N120: obtainable from PERSTORP Specialty Chemicals Hansa ADD 4090, α,ω-primarily hydroxyalkyl-functionalized polydimethylsiloxane (OHZ 20 mg KOH/g): obtainable from CHT Germany GmbH SILFOAM SRE: obtainable from Wacker-Chemie AG Methoxypropyl acetate: obtainable from Haffner GmbH & Co KG Caradol ED 56-200: obtainable from Shell Example 1

2.62 mol of 1-isocyanato-3-isocyanatomethyl-3,5,5-trimethylcyclohexane and 1.5 mmol of 3-methyl-1-phenyl-2-phospholene-1-oxide (AlfaAesar) were weighed and charged at room temperature, and heated at 125° C. with stirring and under an $N_2$ atmosphere. After 6 hours of reaction time, the titrated isocyanate content was 22%. The viscous product shows the characteristic carbodiimide band in an IR spectrum at 2120 $cm^{-1}$.

Example 2

In a one-liter three-necked flask, 2.11 mol of 1-isocyanato-4-[(4-isocyanato-cyclohexyl)methyl]cyclohexane and 1.5 mmol of 3-methyl-1-phenyl-2-phosphol-ene-1-oxide (AlfaAesar) were weighed and charged at room temperature, and heated at 150° C. with stirring and under an $N_2$ atmosphere. After 2 hours of reaction time, the titrated isocyanate content was 22%. The viscous product shows the characteristic carbodiimide band in an IR spectrum at 2120 $cm^{-1}$.

Example 3

In a one-liter three-necked flask, 2.11 mol of 1-isocyanato-4-[(4-isocyanato-cyclohexyl)methyl]cyclohexane and 1.5 mmol of 3-methyl-1-phenyl-2-phosphol-ene-1-oxide (AlfaAesar) were weighed and charged at room temperature, and heated at 150° C. with stirring and under an $N_2$ atmosphere. After 4 hours of reaction time, the titrated isocyanate content was 12%. The highly viscous product shows the characteristic carbodiimide band in an IR spectrum at 2120 $cm^{-1}$.

Example 4

In a two-liter three-necked flask, 125 g of the product according to Example 1 was prepared under an $N_2$ atmosphere, and diluted with 700 g of dipropylene glycol dimethyl ether. Then, 305 g of Hansa SP 1046, and 170 g of Hansa SP 1060 RP and 0.1 g of BICAT® 8108M were added at 65° C. The % NCO content titrated after 30 min was 0.9%. After the addition of 0.140 mol of norcholine and 39 mmol of Jeffcat DPA and another 80 g of the trisiloxane, and after another 30 min of reaction time, the IR spectrum did not show any isocyanate band, but the characteristic carbodiimide band at 2120 $cm^{-1}$. A low viscous clear product with a non-volatile content of 50% was obtained.

Example 5

In a one-liter three-necked flask, 157.5 g of the product according to Example 1 was prepared, and diluted with 300 g of propylene glycol diacetate (Dowanol PGDA®). Then, 272.5 g of Hansa ADD 4035, and 0.243 mol of Hansa SP 1060 RP and 0.2 g of BICAT® 8108M were added at 65° C. The % NCO content titrated after 30 min was 1.3%. After the addition of 0.235 mol of norcholine and another 80 g of the trisiloxane, and after another 30 min of reaction time, the IR spectrum did not show any isocyanate band, but the characteristic carbodiimide band at 2120 $cm^{-1}$. A clear product with a non-volatile content of 70% was obtained.

Example 6

In a one-liter three-necked flask, 165 g of the product according to Example 1 was prepared, and diluted with 300 g of dipropylene glycol dimethyl ether. Then, 285 g of Terathane 2000®, and 0.3 mol of Polyglycol M500 and 0.2 g of BICAT® 8108M were added at 80° C. The % NCO content titrated after 30 min was 1.3%. After the addition of 0.235 mol of norcholine and another 80 g of the monofunctional polyether, and after another 30 min of reaction time, the IR spectrum did not show any isocyanate band, but the characteristic carbodiimide band at 2120 $cm^{-1}$. A clear product with a non-volatile content of 70% was obtained.

Example 7

In a 500-ml three-necked flask, 80 g of the product according to Example 1 was prepared, and diluted with 70 g of dipropylene glycol dimethyl ether. Then, 250 g of Hansa SP 1046, 0.3 g of BICAT® 8108M and 50 g of Polyglycol M 500 were added at 80° C. The % NCO content titrated after 30 min was 1.8%. In parallel, 400 g of soft water with pH=9 was charged in a two-liter three-necked flask, and cooled down to <10° C. The pH was adjusted by adding aqueous sodium hydroxide. Then, the prepolymer obtained from the 500 ml three-necked flask was transferred into the hydraulic seal in the two-liter three-necked flask, and the remaining isocyanate content was eliminated with 18 g of dimethylamino-propylamine. A stable polymer dispersion with a non-volatile content of 39% was formed. The dispersion shows the characteristic carbodiimide band at 2120 $cm^{-1}$ in an IR spectrum.

Example 8

In a 500-ml three-necked flask, 120 g of the product according to Example 1 was prepared, and diluted with 100 g of dipropylene glycol dimethyl ether. Then, 180 g of Hansa ADD 4090, 0.1 g of BICAT® 8108M and 50 g of YMER N120 were added at 65° C. The % NCO content titrated after 30 min was 3.8%. In parallel, 505 g of soft water with pH=10 was charged in a two-liter three-necked flask, and cooled down to a temperature of <10° C. In addition, 0.5 g of a defoamer (SILFOAM SRE) was added. The pH was adjusted by adding aqueous potassium hydroxide. Then, the prepolymer obtained from the 500 ml three-necked flask was transferred into the hydraulic seal in the two-liter three-necked flask, and the remaining isocyanate content was eliminated with 43 g of diethanol amine. A stable polymer dispersion with a non-volatile content of 39% was formed. The dispersion shows the characteristic carbodiimide band at 2120 $cm^{-1}$ in an IR spectrum.

Example 9

In a 500-ml three-necked flask, 80 g of the product according to Example 2 was prepared, and diluted with 70 g of methoxypropyl acetate. Then, 180 g of Hansa SP 1046, 0.1 g of BICAT® 8108M and 0.22 mol of Polyglycol M 500 were added at 65° C. The % NCO content titrated after 30 min was 1.19%. In parallel, 400 g of soft water with pH=8 was charged in a two-liter three-necked flask, and cooled Example 10

In a 500-ml three-necked flask, 80 g of the product according to Example 2 was prepared, and diluted with 70 g of dipropylene glycol dimethyl ether. Then, 180 g of Terathane 2000, 0.1 g of BICAT® 8108M, 0.124 mol of norcholine and 0.22 mol of Polyglycol M 500 were added at 80° C. The % NCO content titrated after 30 min was 0.24%. The thus prepared liquid prepolymer was then transferred into a vessel, and dispersed with 570 g of water with a pH of 9, which was adjusted by adding aqueous sodium hydroxide, in a dissolver. A stable polymer dispersion with a non-volatile content of 39% was formed. The dispersion shows the characteristic carbodiimide band at 2120 cm$^{-1}$ in an IR spectrum.

Example 11

In a 500-ml three-necked flask, 80 g of the product according to Example 1 was prepared, and diluted with 70 g of dipropylene glycol dimethyl ether. Then, 200 g of Hansa SP 1046, 0.2 g of BICAT® 8108M, 50 g of Hansa SP 1060 RP and 50 g of Polyglycol M 500 were added at 65° C. The % NCO content titrated after 30 min was 1.46%. In parallel, 400 g of soft water with pH=9 was charged in a two-liter three-necked flask, and cooled down to a temperature of <10° C. The pH was adjusted by adding aqueous sodium hydroxide. Then, the prepolymer obtained from the 500 ml three-necked flask was transferred into the hydraulic seal in the two-liter three-necked flask, and the remaining isocyanate content was eliminated with 13 g of dimethylaminopropyl amine. A stable polymer dispersion with a non-volatile content of 39% was formed. The dispersion shows the characteristic carbodiimide band at 2120 cm$^{-1}$ in an IR spectrum.

Example 12

In a 500-ml three-necked flask, 80 g of the product according to Example 2 was prepared, and diluted with 70 g of dipropylene glycol dimethyl ether. Then, 180 g of Caradol ED 56-200, 0.1 g of BICAT® 8108M, 0.124 mol of norcholine and 0.22 mol of Polyglycol M 500 were added at 80° C. The % NCO content titrated after 30 min was 0.24%. The thus prepared liquid prepolymer was then dispersed with 570 g of water with a pH of 9, which was adjusted by adding aqueous sodium hydroxide, in a dissolver. A stable polymer dispersion with a non-volatile content of 39% was formed. The dispersion shows the characteristic carbodiimide band at 2120 cm$^{-1}$ in an IR spectrum.

Comparative Example 1

In a one-liter three-necked flask, 80 g of 1-isocyanato-3-isocyanatomethyl-3,5,5-trimethylcyclohexane was weighed and charged, and diluted with 700 g of dipropylene glycol dimethyl ether. Then, 305 g of Hansa SP 1046, and 170 g of Hansa SP 1060 RP and 0.1 g of BICAT® 8108M were added at 65° C. The % NCO content titrated after 30 min was 1.7%. After the addition of 0.140 mol of norcholine and 39 mmol of Jeffcat DPA and another 80 g of the trisiloxane, and after another 30 min of reaction time, the IR spectrum did not show any isocyanate band. A clear product with a non-volatile content of 70% was obtained.

Comparative Example 2

In a 500-ml three-necked flask, 59 g of 1-isocyanato-4-[(4-isocyanatocyclo-hexyl)methyl]cyclohexane was charged, and diluted with 70 g of dipropylene glycol dimethyl ether. Then, 200 g of Hansa SP 1046, 0.1 g of BICAT® 8108M, and 50 g of Polyglycol M 500 were added at 80° C. The % NCO content titrated after 30 min was 1.9%. In parallel, 400 g of soft water with pH=9 was charged in a two-liter three-necked flask, and cooled down to a temperature of <10° C. The pH was adjusted by adding aqueous sodium hydroxide. Then, the prepolymer obtained from the 500 ml three-necked flask was transferred into the hydraulic seal in the two-liter three-necked flask, and the remaining isocyanate content was eliminated with 17 g of dimethylaminopropylamine. A stable polymer dispersion with a non-volatile content of 38% was formed.

Application:
Finishing on 100% CO terry articles, dyed (liquor pick-up: 95%)
pH of the liquors: 5.0
kind of application: foulard
drying: 5 min at 120° C.; 2 min setting at 150° C.
washing conditions: 40 g of Tandil mild detergent, Miele top loader washing machine (short program)
drying conditions: drying on the clothesline after each washing

| Example | 4 | 5 | 6 | Comp. 1 | 8 | 9 | 10 | 11 | 12 | 13 | Comp. 2 |
|---|---|---|---|---|---|---|---|---|---|---|---|
| non-volatile content (%) | 50 | 70 | 70 | 70 | 39 | 39 | 39 | 39 | 39 | 39 | 38 |
| amount employed (g/l) | 16 | 11 | 11 | 11 | 20 | 20 | 20 | 20 | 20 | 20 | 20 |
| soft handle unwashed | 5 | 5 | 3 | 5 | 5 | 5 | 5 | 4 | 5 | 3 | 5 |
| soft handle after 1 washing | 4 | 4 | 3 | 1 | 5 | 4 | 2 | 4 | 4 | 3 | 0 |
| soft handle after 5 washings | 3 | 4 | 2 | 0 | 4 | 4 | 0 | 4 | 3 | 2 | 0 |
| hydrophilicity (TEGEWA) dropping test, unwashed (s) | 8 | 6 | 12 | 4 | 151 | 4 | 8 | 6 | 5 | <1 | 110 |

Grading scale of the soft handle evaluation: Grade 5 corresponds to a very good soft handle, grade 0 corresponds to the level of the raw fabric.

The influence of the washings on the initial textile quality has been included in the handle evaluation. The unfinished starting fabrics/blanks were also respectively subjected to several washings.

Finishing on 100% polyester knitted fabric, prewashed (liquor pick-up: 100%)
  pH of the liquors: 5.0
  kind of application: foulard
  drying: 2 min at 120° C.; 2 min setting at 150° C.
  washing conditions: 40 g of Tandil mild detergent, Miele top loader washing machine (short program)
  drying conditions: drying on the clothesline after each washing

| Example | 4 | 5 | 6 | Comp. 1 | 8 | 9 | 10 | 11 | 12 | 13 | Comp. 2 |
|---|---|---|---|---|---|---|---|---|---|---|---|
| non-volatile content (%) | 50 | 70 | 70 | 70 | 39 | 39 | 39 | 39 | 39 | 39 | 38 |
| amount employed (g/l) | 16 | 11 | 11 | 11 | 20 | 20 | 20 | 20 | 20 | 20 | 20 |
| soft handle unwashed | 5 | 5 | 3 | 5 | 5 | 5 | 4 | 4 | 5 | 4 | 5 |
| soft handle after 1 washing | 3 | 4 | 2 | 0 | 5 | 3 | 3 | 4 | 4 | 3 | 1 |
| soft handle after 5 washings | 3 | 3 | 2 | 0 | 4 | 3 | 2 | 3 | 3 | 3 | 0 |
| hydrophilicity (TEGEWA) dropping test, unwashed (s) | 7 | 5 | 15 | 3 | 53 | 1 | 9 | 2 | 3 | <1 | 60 |

Grading scale of the soft handle evaluation: Grade 5 corresponds to a very good soft handle, grade 0 corresponds to the level of the raw fabric.

The influence of the washings on the initial textile quality has been included in the handle evaluation. The unfinished starting fabrics/blanks were also respectively subjected to several washings.

Finishing on 100% CO single jersey, optically brightened (liquor pick-up: 90%)
  pH of the liquors: 5.0
  kind of application: foulard
  drying: 2 min at 120° C.; 2 min setting at 150° C.
  washing conditions: 40 g of Tandil mild detergent, Miele top loader washing machine (short program)
  drying conditions: drying on the clothesline after each washing

| Example | 4 | 5 | 6 | Comp. 1 | 8 | 9 | 10 | 11 | 12 | 13 | Comp. 2 |
|---|---|---|---|---|---|---|---|---|---|---|---|
| non-volatile content (%) | 50 | 70 | 70 | 70 | 39 | 39 | 39 | 39 | 39 | 39 | 38 |
| amount employed (g/l) | 16 | 11 | 11 | 11 | 20 | 20 | 20 | 20 | 20 | 20 | 20 |
| soft handle unwashed | 5 | 5 | 4 | 5 | 5 | 5 | 5 | 4 | 5 | 3 | 5 |
| soft handle after 1 washing | 4 | 3 | 2 | 1 | 5 | 4 | 3 | 4 | 4 | 3 | 2 |
| soft handle after 5 washings | 1 | 3 | 2 | 0 | 4 | 3 | 1 | 2 | 2 | 3 | 0 |
| hydrophilicity (TEGEWA) dropping test, unwashed (s) | 13 | 20 | 27 | 3 | >300 | 5 | 9 | 14 | 18 | <1 | >300 |

Grading scale of the soft handle evaluation: Grade 5 corresponds to a very good soft handle, grade 0 corresponds to the level of the raw fabric. The influence of the washings on the initial textile quality has been included in the handle evaluation. The unfinished starting fabrics/blanks were also respectively subjected to several washings.

The invention claimed is:

1. Polyurethane/polyorganosiloxane and/or polyurea-polyorganosiloxane compounds and salts thereof that contain at least one structural element of formula [II]

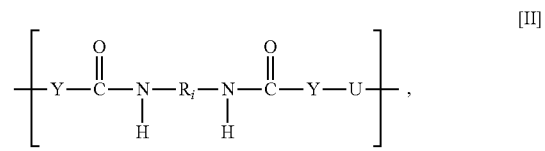

and $R_i$ is a structural element of formula [III]

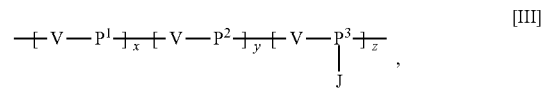

in which V has the structure [V]:

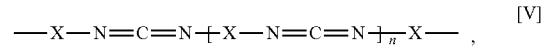

in which n=0 to 10, and X is derived from aromatic, cycloaliphatic or aliphatic, at least divalent, linear or branched mono- or polyisocyanates and their mixtures of isomers and/or mixtures of different diisocyanates having up to 15 carbon atoms that were subjected to a carbodiimidation reaction, wherein said reaction yields a compound of formula [XII]:

wherein —V— is as defined above, and $x \geq 2$;

$P^1$ is derived from polyols or polyamines adhering to formula (XIII) where $P^1$ is a polymer moiety selected from the group consisting of a polycarbonate, polyester, polyether, polyacrylate, polyolefin, polydimethylsiloxane, polylactone, polyamides, polyurea, polyurethane, copolymers thereof, and mixtures of such polymers, terminated with hydroxyl- or amine groups:

 (XIII)

wherein g≥1, and Y=—NR$^A$— or —O—, and RA represents hydrogen or a linear, branched, cyclic, saturated, unsaturated or aromatic hydrocarbyl radical with up to 20 carbon atoms, which may additionally contain several groups selected from —O—, —C(O)—, —NH—, tertiary amines, or quaternary ammonium compounds;

P$^2$ is derived from an α,ω-primary or secondary amino- or hydroxyalkyl- or hydroxypolyetheralkyl-functionalized polyorganosiloxane having the structure

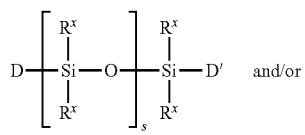 [VII]

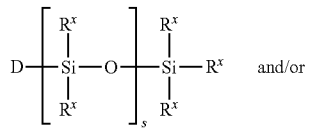 [VIII]

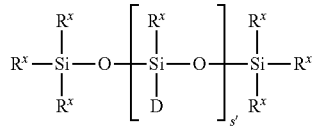 [IX]

in which s=2 to 500 and s'=1 to 3, D and D' are primary or secondary hydroxy- or aminoalkyl- or hydroxypolyether-terminated organic radicals having up to 200 carbon atoms, which is capable of undergoing a chemical polyaddition reaction with [XII], D and D' are additionally the same or different, and R$^x$ is a linear, branched, cyclic, saturated, unsaturated, aromatic, substituted or unsubstituted hydrocarbyl radical having up to 20 carbon atoms, which may additionally bear amino or quaternary ammonium compounds or hydroxyalkyl or hydroxypolyetheralkyl groups, whereby P may provide a comb-like structure, P$^2$ is selected independently of P$^1$;

P$^3$ is a linear, branched, cyclic, saturated, unsaturated, aromatic, substituted, or unsubstituted group with up to 20 carbon atoms, which is converted to its salts by a protonatable or deprotonatable group -J-, to enable the polymer to achieve water solubility, emulsifiability and/or dispersibility, where, x, y, and z are all integers ≥1;

and a chain extender —U— selected from aliphatic, monovalent, divalent or polyvalent, linear or branched polyols or polyamines with up to 15 carbon atoms, or from primary or secondary amino- or hydroxy-terminated polyethers with a molecular weight of up to 1000 g/mol.

2. The polyurethane and/or polyurea-polyorganosiloxane compounds according to claim 1, wherein n=0 to 5, and s=5 to 150, and —V— is a linear compound with x=2.

3. The polyurethane and/or polyurea-polyorganosiloxane compounds according to claim 1, containing from 5 to 80% by weight of a polyorganosiloxane, based on the polymeric polyurethane and/or polyurea-polyorganosiloxane compounds.

4. Formulations comprising compounds according to claim 1, further containing fillers, pigments, additives, solvents, and surface-active compounds and emulsifiers.

5. Formulations according to claim 4, wherein said solvents comprise water.

6. Formulations comprising compounds according to claim 1, comprising:
   a. from 5 to 90% by weight of the polymeric polyurethane and/or polyurea-polyorganosiloxane compounds;
   b. from 0 to 10% by weight of additives, processing aids, aid dispersing aids; and
   c. from 10 to 90% by weight of organic solvents and/or water.

7. Formulations comprising compounds according to claim 1, containing further additives selected from cross-linking agents, defoamers, processing aids, softeners and/or other polymer dispersions.

8. Textiles containing fibers treated with a formulation according to claim 4.

9. Textiles containing fibers treated with a formulation according to claim 5.

10. The polyurethane and/or polyurea-polyorganosiloxane compounds according to claim 1, wherein n=0 to 5, and s=5 to 150, and —V— is a linear compound with x=2.

11. The polyurethane and/or polyurea-polyorganosiloxane compounds according to claim 3, containing from 10 to 70% by weight, of the polyorganosiloxane.

12. Formulations according to claim 6, further containing fillers, pigments, additives, solvents, and surface-active compounds and emulsifiers.

13. Formulations according to claim 4, further containing additives selected from cross-linking agents, defoamers, processing aids, softeners and/or other polymer dispersions.

14. A method of softening and protecting fibers comprising treating them with the formulation of claim 6.

* * * * *